US009715466B1

(12) United States Patent
Bickelman et al.

(10) Patent No.: US 9,715,466 B1
(45) Date of Patent: Jul. 25, 2017

(54) PROCESSING INPUT/OUTPUT OPERATIONS IN A CHANNEL USING A CONTROL BLOCK

(71) Applicant: INTERNATIONAL BUSINESS MACHINES CORPORATION, Armonk, NY (US)

(72) Inventors: Craig A. Bickelman, Weatherly, PA (US); Daniel Casper, Poughkeepsie, NY (US); Christopher Colonna, Ossining, NY (US); John Flanagan, Poughkeepsie, NY (US); Francis Gassert, Monroe, NY (US); Elke G. Nass, Boeblingen (DE); Kenneth J. Oakes, Wappingers, NY (US); Mooheng Zee, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/274,137

(22) Filed: Sep. 23, 2016

(51) Int. Cl.
*G06F 13/00* (2006.01)
*G06F 13/16* (2006.01)
*G06F 13/12* (2006.01)
*G06F 3/06* (2006.01)

(52) U.S. Cl.
CPC .......... *G06F 13/1642* (2013.01); *G06F 3/065* (2013.01); *G06F 3/068* (2013.01); *G06F 3/0619* (2013.01); *G06F 3/0659* (2013.01); *G06F 13/12* (2013.01)

(58) Field of Classification Search
CPC .... G06F 13/1642; G06F 3/0619; G06F 3/065; G06F 3/0659; G06F 3/068; G06F 13/12
USPC .......................................................... 710/112
See application file for complete search history.

(56) References Cited

U.S. PATENT DOCUMENTS 4,564,903 A * 1/1986 Guyette ................ G06F 9/4843 711/147
4,843,541 A * 6/1989 Bean ..................... G06F 9/5077 710/262
5,423,026 A * 6/1995 Cook ................... G06F 11/142 714/23

(Continued)

OTHER PUBLICATIONS

Karan Singh, et al., Ficon Planning and Implementation Guide? IBM RedBook, FICON planning and Implementation Guide, Mar. 2012, p. 1-526.

*Primary Examiner* — Paul R Myers
(74) *Attorney, Agent, or Firm* — Cantor Colburn LLP; Steven Chiu

(57) ABSTRACT

Examples of techniques for processing I/O operations in a channel are disclosed. In one example implementation according to aspects of the present disclosure, a computer-implemented method may include: copying, by a system assist processor, a subchannel of the channel into a lower portion of a channel communication area responsive to receiving the I/O operation; copying, by the system assist processor, channel program information from a designated starting location in a customer memory into a control block; building, by the system assist processor, a starting channel communication area into a top portion of the control block; queuing, by the system assist processor, the control block to a queue for the channel; processing, by the channel, the I/O operation responsive to retrieving the control block from the queue.

15 Claims, 6 Drawing Sheets

400

Copying, By A System Assist Processor, A Subchannel Of The Channel Into A Lower Portion Of A Channel Communication Area Responsive To Receiving The I/O Operation 402

Copying, By The System Assist Processor, Channel Program Information From A Designated Starting Location In A Customer Memory Into A Control Block 404

Building, By The System Assist Processor, A Starting Channel Communication Area Into A Top Portion Of The Control Block 406

Queuing, By The System Assist Processor, The Control Block To A Queue For The Channel 408

Processing, By The Channel, The I/O Operation Responsive To Retrieving The Control Block From The Queue 410

(56) References Cited

U.S. PATENT DOCUMENTS

| | | | | |
|---|---|---|---|---|
| 5,459,838 | A | 10/1995 | Coscarella et al. | |
| 5,584,039 | A * | 12/1996 | Johnson | G06F 13/126 710/1 |
| 2007/0011407 | A1* | 1/2007 | Kuehl | G06F 11/2284 711/141 |
| 2009/0013153 | A1* | 1/2009 | Hilton | G06F 9/5077 712/29 |
| 2009/0024714 | A1* | 1/2009 | Raisch | G06F 13/28 709/212 |
| 2009/0210580 | A1 | 8/2009 | Bendyk et al. | |
| 2010/0030919 | A1 | 2/2010 | Flanagan et al. | |
| 2010/0036975 | A1 | 2/2010 | Kalos et al. | |
| 2014/0223118 | A1* | 8/2014 | Ignomirello | G06F 12/16 711/161 |
| 2016/0216965 | A1* | 7/2016 | Coneski | G06F 3/0608 |

* cited by examiner

PROCESSING INPUT/OUTPUT OPERATIONS IN A CHANNEL USING A CONTROL BLOCK

BACKGROUND

The present disclosure relates generally to data processing and relates, more particularly to processing input/output (I/O) operations in a channel using a control block.

In the Enterprise Systems Architecture/390 implemented by IBM® System z, input/output (I/O) operations are initiated via a "Start Subchannel" instruction. This instruction designates a subchannel (i.e., an internal representation of an I/O device to be used for the operation) and an Operation Request Block (ORB), which, in turn, specifies the address of a Transport Control Word (TCW) or Channel Command Word (CCW) channel program. These specify the list of commands to be executed by the device.

In executing the Start Subchannel instruction, a processing system copies the ORB information into the subchannel and passes the operation to a System Assist Processor (SAP). The SAP selects a channel to perform the operation, and places a channel communication area (CCA) on the work queue for the selected channel in a base hardware system area (HSA).

SUMMARY

According to examples of the present disclosure, techniques including methods, systems, and/or computer program products for processing I/O operations in a channel are provided. An example method may include: copying, by a system assist processor, a subchannel of the channel into a lower portion of a channel communication area responsive to receiving the I/O operation; copying, by the system assist processor, channel program information from a designated starting location in a customer memory into a control block; building, by the system assist processor, a starting channel communication area into a top portion of the control block; queuing, by the system assist processor, the control block to a queue for the channel; processing, by the channel, the I/O operation responsive to retrieving the control block from the queue.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

According to aspects of the present disclosure, a system assist processor (SAP) has local access to a subchannel and a channel program which reside in the memory structure of the SAP. The SAP can access the subchannel and the channel program sequentially with less latency and package the subchannel and the channel program along with the original channel communication area (CCA). In particular, the CCA points to the subchannel, which in turn points to the channel program. The SAP can then send the subchannel and the channel program down to the channel together. Consequently, less "fetches" are used in the present implementation than are used in existing approaches.

Example embodiments of the disclosure include or yield various technical features, technical effects, and/or improvements to technology. Example embodiments of the disclosure a control block, referred to as an ExCCA, to facilitate processing I/O operations in a channel. These aspects of the disclosure constitute technical features that yield the technical effect of using fewer fetches than existing approaches and the technical effect of using fewer processing resources and fewer memory resources to facilitate the processing of the I/O operations in the channel than existing approaches. As a result of these technical features and technical effects, the control block (or "ExCCA") in accordance with example embodiments of the disclosure represents an improvement to existing I/O processing approaches. It should be appreciated that the above examples of technical features, technical effects, and improvements to the technology of example embodiments of the disclosure are merely illustrative and not exhaustive.

Figure 1:
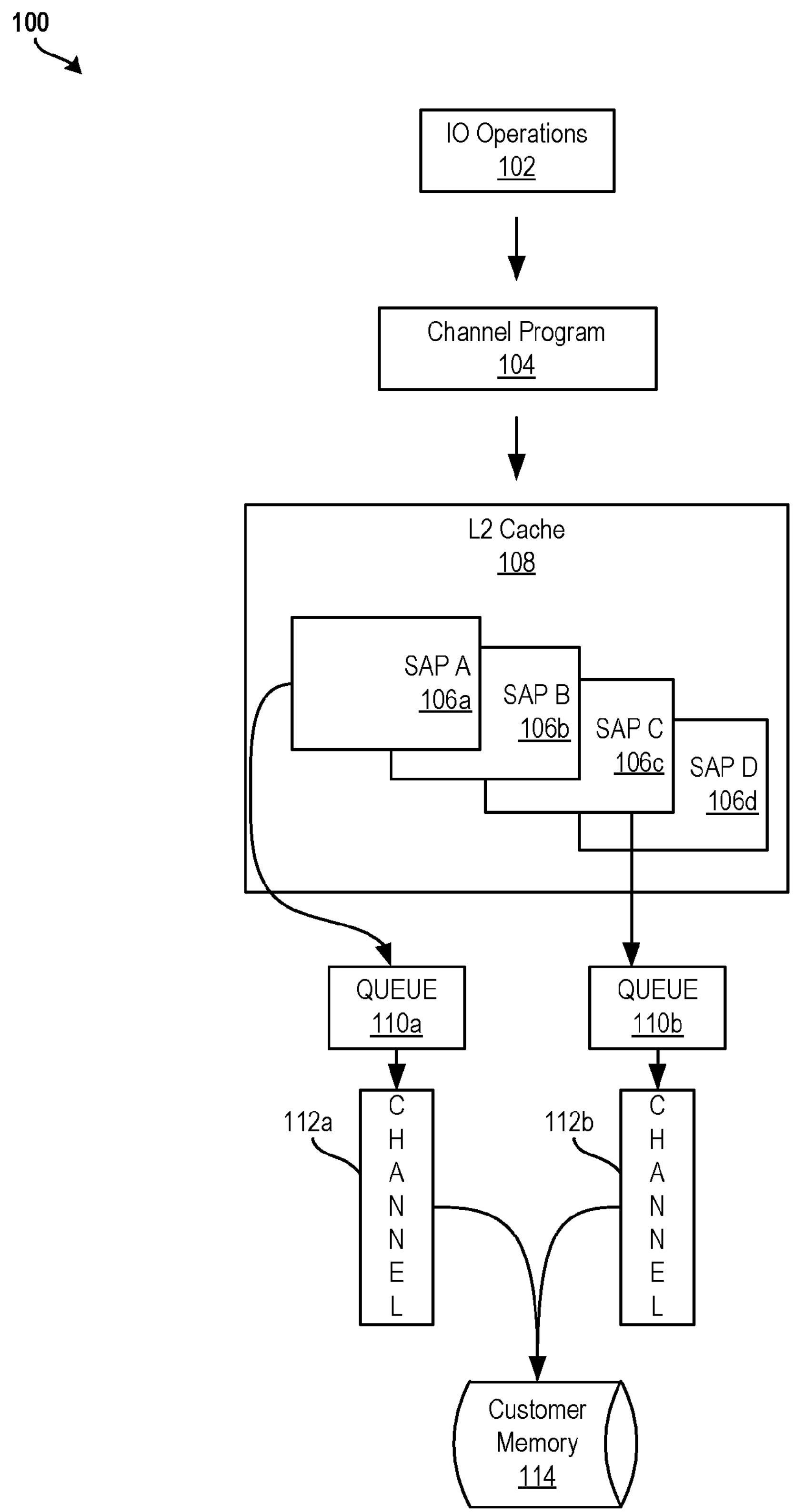
FIG. 1 illustrates a block diagram of a processing system for processing input/output (I/O) operations in a channel according to aspects of the present disclosure

FIG. 1 illustrates a block diagram of a processing system 100 for processing input/output (I/O) operations in a channel according to aspects of the present disclosure. I/O operations 102 are received and sent through a channel program 104 to a SAP, such as SAP A 106*a*, SAP B 106*b*, SAP C 106*c*, SAP D 106*d* (referred to herein as SAP 106), which sit on top of a memory space such as L2 cache 108. The SAP 106 represent standard general I/O processors that are peeled off of core processors and are assigned to manage and process the I/O channel and I/O operations. The SAP 106 collects work from general processors that are executing instructions and encounter an I/O instruction, which is offloaded to the SAP 106 for processing.

The SAP 106 queues the I/O operations in queues 110*a*, 110*b*. The channels 112*a*, 112*b*, then process the queued I/O operations from the queues 110*a*, 110*b* respectively and pass the commands to a customer memory 114, which may represent a storage space accessible by a customer of the processing system 100.

Figure 2:
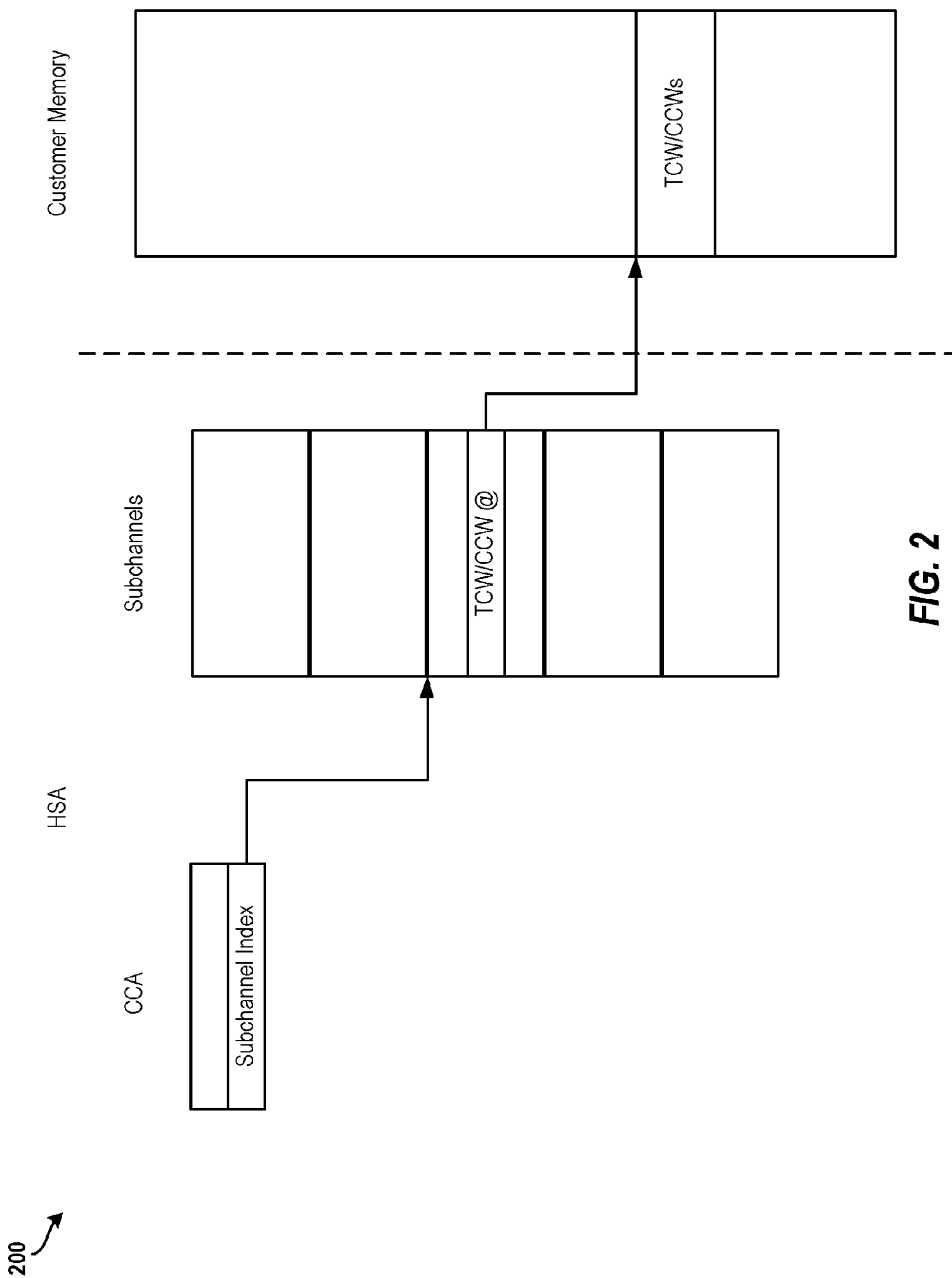
FIG. 2 illustrates a block diagram of an environment for processing input/output (I/O) operations in a channel according to aspects of the present disclosure.

FIG. 2 illustrates a block diagram of an environment 200 for processing input/output (I/O) operations in a channel according to aspects of the present disclosure. A front end of the operation begins when a channel fetches a channel communication area (CCA) from a hardware system area (HSA). The CCA identifies a subchannel control block, which is then fetched from the HSA. The subchannel contains the address of a transport control word (TCW) or channel command word (CCW) chain in a memory, such as a memory of a customer processing system. The address of the TCW or the CCW is fetched to be inspected for errors.

A back end of the operation illustrated in FIG. 1 proceeds in reverse. The subchannel is updated with the ending status of the operation and stored back to the HSA. After this, the CCA is stored back to the HSA to provide initiative for the system assist processor (SAP) to process the ending interrupt. Thus, a minimum of three serialized fetches and two serialized stores is performed for each I/O operation executed by the channel.

The I/O operation 102 of FIG. 1 is dictated by the architecture of the Start Subchannel instruction. However, as processing systems, such as z/Architecture systems from IBM®, become faster and more powerful, the I/O operation 102 of FIG. 1 has become increasingly problematic for various reasons. For example, the increased speeds are achieved partially by keeping data close to the processing devices (locality). At the same time, the cost (i.e., latency) of moving data between spatially-disperse elements such as processor caches and channel cards has become significant. Moreover, the higher system capability demands faster channels. Thus, it may be useful to move the mainline channel processing from a general purpose processor to hardware or other specialized engines. However, requiring such specialized engines to execute multiple long duration fetches and stores greatly reduces their efficiency.

Figure 3A:
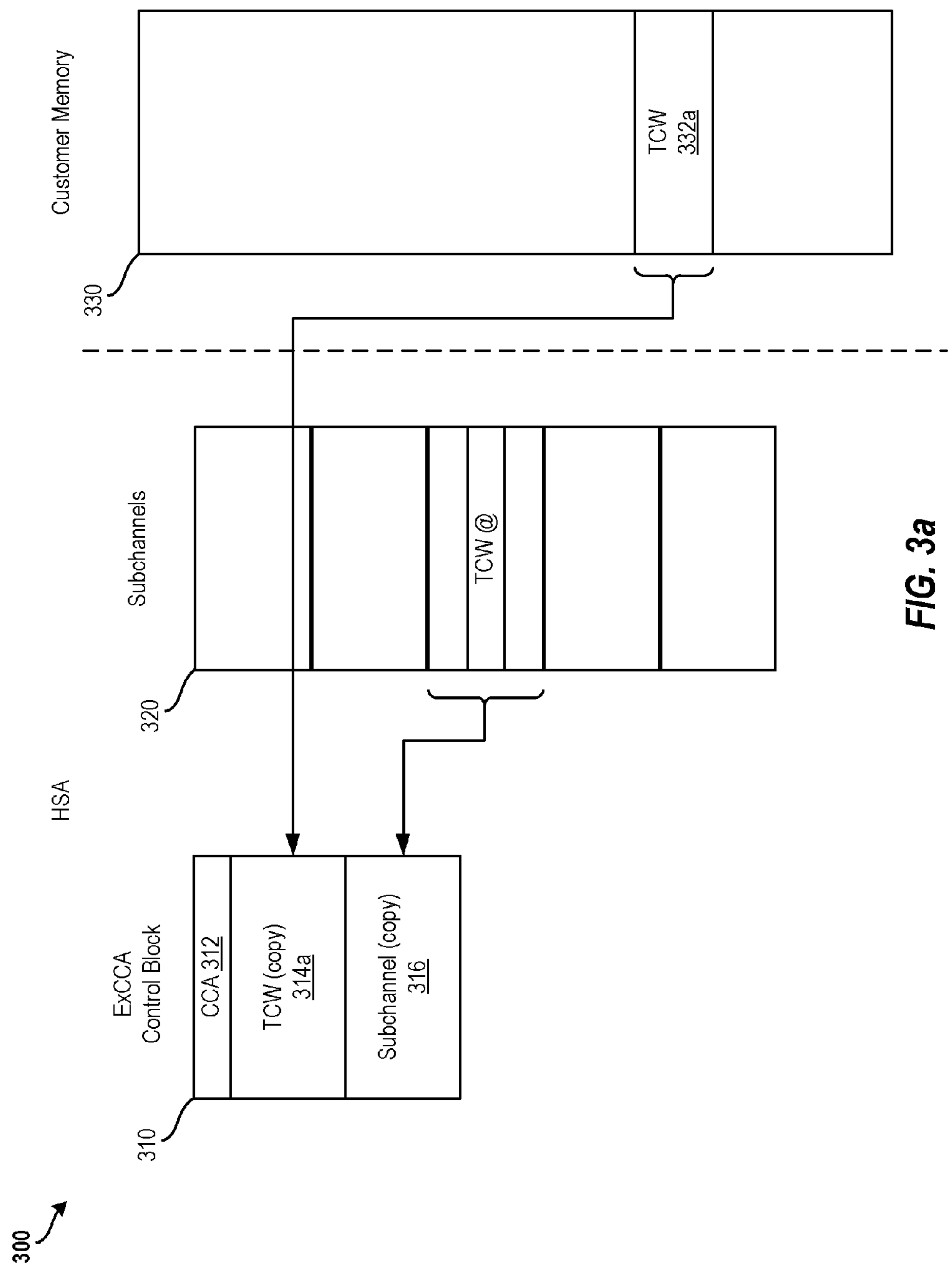
FIGS. 3A and 3B illustrate a block diagram of an environment for processing I/O operations in a channel using a control block according to aspects of the present disclosure.
Figure 3B:
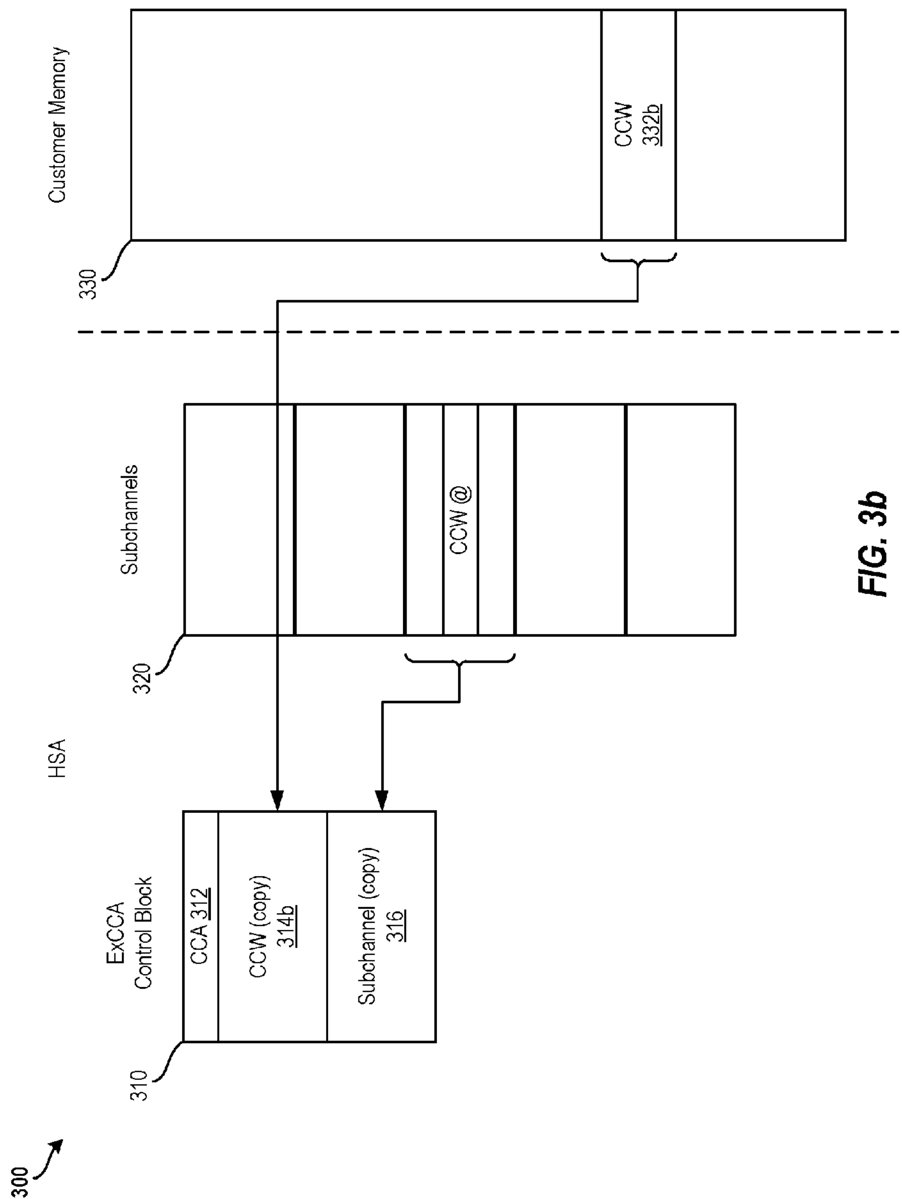

FIGS. 3A and 3B illustrate a block diagram of an environment 300 for processing I/O operations in a channel using a control block according to aspects of the present disclosure. A control block 310, also referred to as "ExCCA," is defined which contains the data utilized for the execution of an I/O operation in a single contiguous location. The system assist processor (e.g., SAP 106 of FIG. 1) can efficiently construct the control block 310 because it has local access to the memory (e.g., L2 cache 108 of FIG. 1). The channel (e.g., the channels 112*a*, 112*b* of FIG. 1) can access the control block 310 with a single fetch from HSA and store it back at the end of the operation with a single store.

The size of the CCA block 312 is increased, for example from 16 bytes to 256 bytes. To pass the operation to the selected channel, the SAP copies the subchannel 320 into a lower portion of the block (i.e., subchannel (copy) 316). This increases efficiency over existing techniques because both the subchannel and the control block are in the SAP's cache.

Next, the SAP copies the channel program information from the designated starting location in a customer memory 330 as follows. If, as illustrated in FIG. 3A, the I/O operation is a Transport Mode (HPF) operation, the SAP copies the 64 byte TCW 332*a* to a designated area in the control block (i.e., TCW (copy) 314*a*).

If, as illustrated in FIG. 3B, the operation is a Command Mode operation, then the SAP copies the 64-byte CCW 332*b* to a designated area in the control block (i.e., CCW (copy 314*b*). Thus between one and eight 8-byte CCWs may be copied into the control block, depending on alignment. While it is true in the general case that more CCWs may be required for the operation, and thus the channel must make additional fetches to retrieve them, the typical performance critical direct-access storage device (DASD) channel program consists of, for example, two or three CCWs. Thus the channel may receive the information it needs to perform the operation in the control block 310 for either Transport mode (i.e., TCW) or Command mode (i.e., CCW) operations.

Finally, the SAP builds the CCA into a top portion of the control block 310 and queues the control block 310 on the selected channel's queue. At the end of the operation, the channel updates the subchannel portion of the control block 310 with an ending status, builds the ending CCA in the CCA section, and queues the control block 310 back to the SAP. The CCW/TCW portion of the subchannel block is unused/reserved at the back end of the operation.

According to aspects of the present disclosure, it is important that the checking requirements of the ESA/390 architecture be adhered to when executing the start subchannel function. In previous approaches, the channel was responsible for checking that the starting channel program address was aligned on the proper boundary (e.g., 8 bytes for Command Mode or 64 bytes for Transport Mode). The channel was also responsible for reporting any storage errors when fetching the TCW/CCWs. In contrast, the present techniques utilize the SAP to perform the checking. If the SAP detects a boundary error or encounters any errors accessing customer memory, the SAP terminates the start operation with a bad ending status and does not send the control block 310 to the channel.

The present techniques allow the channel easier and faster access to the memory data required for the I/O operation and allow for automation of program execution. Besides the latency improvement, this simplicity means that the execution of these channel programs can be offloaded to hardware engines that run in parallel to the channel firmware. The removal of several non-local, dependent memory accesses and the hardware offload provide increased performance.

Figure 4:
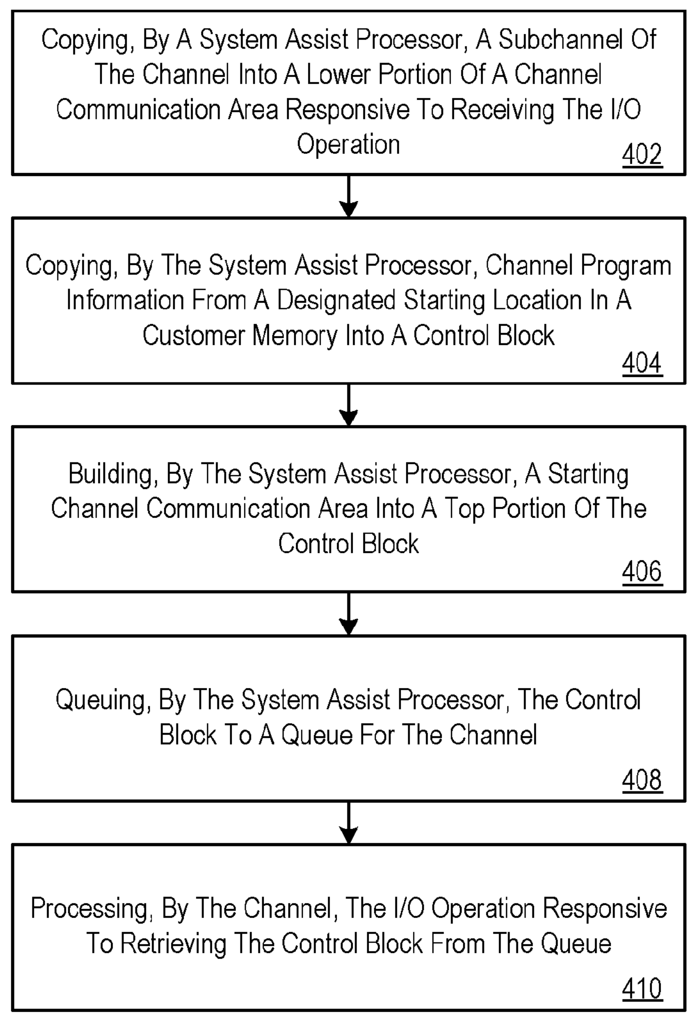
FIG. 4 illustrates a block diagram of a method for processing I/O operations in a channel using a control block according to aspects of the present disclosure according to examples of the present disclosure.

FIG. 4 illustrates a flow diagram of a method 400 for processing I/O operations in a channel using a control block according to aspects of the present disclosure according to examples of the present disclosure. It should be appreciated that the method 400 may be performed by a processing system, such as the processing system 100 of FIG. 1, the processing system 20 of FIG. 5, or by another suitable processing system.

At block 402, the method 400 includes copying, by a system assist processor, a subchannel of the channel into a lower portion of a channel communication area responsive to receiving the I/O operation. According to aspects of the present disclosure, copying the channel program information may include copying a transport control word or copying a channel command word. It should be appreciated that the subchannel and the control block reside in a cache of the system assist processor according to aspects of the present disclosure.

At block 404, the method 400 includes copying, by the system assist processor, channel program information from a designated starting location in a customer memory into a control block.

At block 406, the method 400 includes building, by the system assist processor, a starting channel communication area into a top portion of the control block.

At block 408, the method 400 includes queuing, by the system assist processor, the control block to a queue for the channel.

At block 410, the method 400 includes processing, by the channel, the I/O operation responsive to retrieving the control block from the queue.

Additional processes also may be included. For example, the method 400 may include updating, by the channel, a subchannel portion of the control block with an ending status. Subsequent to updating the subchannel portion of the control block with the ending status, the method 400 may include building, by the system assist processor, an ending channel communication area in the control block. The method 400 may further include queuing the control block back to the system assist processor subsequent to building the ending channel communication area in the control block.

In addition, the method 400 may include generating errors as appropriate. For example, the method 400 may include, responsive to the system assist processor detecting a boundary error, sending a bad ending status without queuing the control block to the queue. In another example, the method 400 may include, responsive to the system assist processor encountering an error accessing the customer memory, sending a bad ending status without queuing the control block to the queue.

It should be understood that the processes depicted in FIG. 4 represent illustrations, and that other processes may be added or existing processes may be removed, modified, or rearranged without departing from the scope and spirit of the present disclosure.

Figure 5:
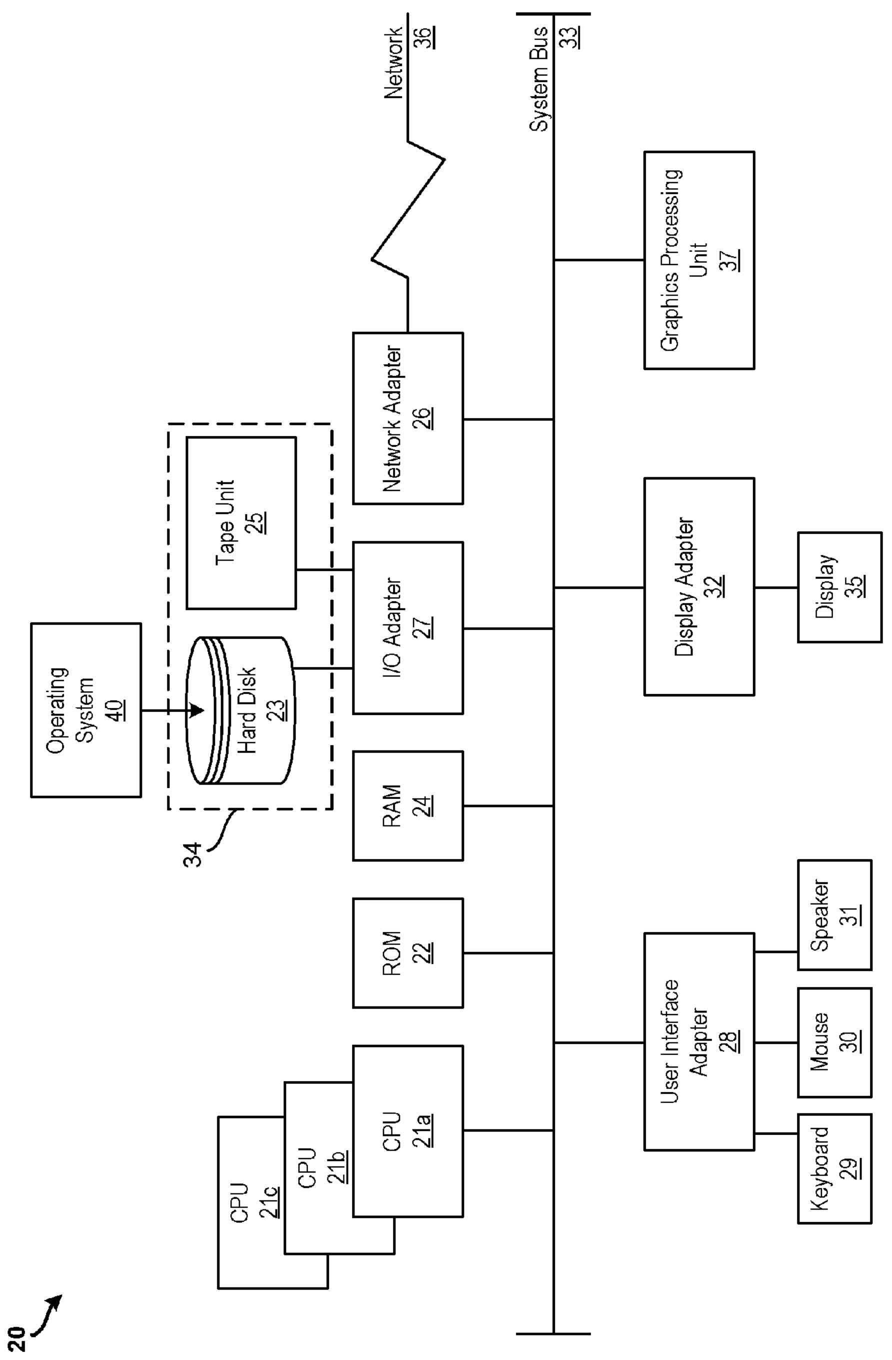
FIG. 5 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 5 illustrates a block diagram of a processing system 20 for implementing the techniques described herein. In examples, processing system 20 has one or more central processing units (processors) 21*a*, 21*b*, 21*c*, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for processing an input/output (I/O) operation in a channel using a control block, the method comprising:

copying, by a system assist processor, a subchannel of the channel into a lower portion of a channel communication area responsive to receiving the I/O operation;

copying, by the system assist processor, channel program information from a designated starting location in a customer memory into a control block;

building, by the system assist processor, a starting channel communication area into a top portion of the control block;

queuing, by the system assist processor, the control block to a queue for the channel;

processing, by the channel, the I/O operation responsive to retrieving the control block from the queue;

updating, by the channel, a subchannel portion of the control block with an ending status; and building, by the channel, an ending channel communication area in the control block subsequent to updating the subchannel portion of the control block with the ending status.

2. The computer-implemented method of claim 1, further comprising:

queuing the control block back to the system assist processor subsequent to building the ending channel communication area in the control block.

3. The computer-implemented method of claim 1, wherein copying the channel program information further comprises copying a transport control word.

4. The computer-implemented method of claim 1, wherein copying the channel program information further comprises copying a channel command word.

5. The computer-implemented method of claim 1, wherein the subchannel and the control block reside in a cache of the system assist processor.

6. The computer-implemented method of claim 1, further comprising responsive to the system assist processor detecting a boundary error, sending a bad ending status without queuing the control block to the queue.

7. The computer-implemented method of claim 1, further comprising responsive to the system assist processor encountering an error accessing the customer memory, sending a bad ending status without queuing the control block to the queue.

8. A system for processing an input/output (I/O) operation in a channel using a control block, the system comprising:

a memory having computer readable instructions; and a processing device for executing the computer readable instructions, the computer readable instructions comprising:

copying, by a system assist processor, a subchannel of the channel into a lower portion of a channel communication area responsive to receiving the I/O operation;

copying, by the system assist processor, channel program information from a designated starting location in a customer memory into a control block;

building, by the system assist processor, a starting channel communication area into a top portion of the control block;

queuing, by the system assist processor, the control block to a queue for the channel;

processing, by the channel, the I/O operation responsive to retrieving the control block from the queue;

updating, by the channel, a subchannel portion of the control block with an ending status; and building, by the channel, an ending channel communication area in the control block subsequent to updating the subchannel portion of the control block with the ending status.

9. The system of claim 8, the computer readable instructions further comprising:

queuing the control block back to the system assist processor subsequent to building the ending channel communication area in the control block.

10. The system of claim 8, wherein copying the channel program information further comprises copying a transport control word.

11. The system of claim 8, wherein copying the channel program information further comprises copying a channel command word.

12. The system of claim 8, wherein the subchannel and the control block reside in a cache of the system assist processor.

13. The system of claim 8, the computer readable instructions further comprising:

responsive to the system assist processor detecting a boundary error, sending a bad ending status without queuing the control block to the queue.

14. The system of claim 8, the computer readable instructions further comprising responsive to the system assist processor encountering an error accessing the customer memory, sending a bad ending status without queuing the control block to the queue.

15. A computer program product for processing an input/output (I/O) operation in a channel using a control block, the computer program product comprising:

a computer readable storage medium having program instructions embodied therewith, the program instructions executable by a processing device to cause the processing device to perform a method comprising:

copying, by a system assist processor, a subchannel of the channel into a lower portion of a channel communication area responsive to receiving the I/O operation;

copying, by the system assist processor, channel program information from a designated starting location in a customer memory into a control block;

building, by the system assist processor, a starting channel communication area into a top portion of the control block;

queuing, by the system assist processor, the control block to a queue for the channel;

processing, by the channel, the I/O operation responsive to retrieving the control block from the queue;

updating, by the channel, a subchannel portion of the control block with an ending status; and building, by the channel, an ending channel communication area in the control block subsequent to updating the subchannel portion of the control block with the ending status.

* * * * *